United States Patent
Salama et al.

(10) Patent No.: US 9,537,707 B2
(45) Date of Patent: *Jan. 3, 2017

(54) SYSTEM FOR SELF ORGANIZATION OF AN INTERNET PROTOCOL TELEVISION GRID

(71) Applicant: International Business Machines Corporation, Armonk, NY (US)

(72) Inventors: Hitham A. A. A. Salama, Dublin (IE); Jonathan Dunne, Dungarvan (IE); Paul B. French, Cork (IE); James P. Galvin, Jr., Georgetown, KY (US); Patrick J. O'Sullivan, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,892

(22) Filed: Feb. 17, 2015

(65) Prior Publication Data

US 2015/0281753 A1 Oct. 1, 2015

Related U.S. Application Data

(63) Continuation of application No. 14/226,993, filed on Mar. 27, 2014.

(51) Int. Cl.
*H04N 21/2385* (2011.01)
*H04N 21/24* (2011.01)
(Continued)

(52) U.S. Cl.
CPC ........ *H04L 29/08954* (2013.01); *H04H 20/12* (2013.01); *H04L 43/0823* (2013.01);
(Continued)

(58) Field of Classification Search
CPC ............ H04N 21/2402; H04N 21/6125; H04N 21/64322; H04N 21/2385; H04N 17/004; H04L 29/08954; H04L 29/06027; H04L 69/14; H04L 43/0823; H04L 43/0858; H04L 65/80; H04L 67/322; H04H 20/12

See application file for complete search history.

(56) References Cited

U.S. PATENT DOCUMENTS 8,646,016 B2 * 2/2014 Kubat ............. H04N 21/23113
725/110
2002/0015386 A1 2/2002 Kajiwara
(Continued)

FOREIGN PATENT DOCUMENTS

WO 2011072414 A1 6/2011

OTHER PUBLICATIONS

Brogle et al., "Quality of Service for Peer-to-Peer based Networked Virtual Environments", Institute of Computer Science and Applied Mathematics, Universität Bern, Neubrückstrasse 10, 3012 Bern, Switzerland, 2008 14th IEEE International Conference on Parallel and Distributed Systems, pp. 847-852, 1521-9097/08, © 2008 IEEE, DOI 10.1109/ICPADS.2008.95.

(Continued)

*Primary Examiner* — Randy Flynn
(74) *Attorney, Agent, or Firm* — David B. Woycechowsky

(57) ABSTRACT

A self-organizing internet protocol television (IPTV) grid system that: establishes an internet protocol television grid including an IPTV server, a plurality of grid nodes, a first end user device and a second end user device; communicates an IPTV channel signal over a first communication path that begins at the IPTV server and ends at the first end user device; communicates the IPTV channel signal over a second communication path that begins at the IPTV server and ends at the second end user device; determines that a quality issue condition exists for the channel signal as communicated to the second end user device; and responsive to the determination of the quality issue condition, communicates (Continued)

the IPTV channel signal over a third communication path that begins at the first end user device and ends at the second end user device.

3 Claims, 5 Drawing Sheets

(51) Int. Cl.
  *H04N 21/61* (2011.01)
  *H04N 21/643* (2011.01)
  *H04L 29/06* (2006.01)
  *H04L 29/08* (2006.01)
  *H04H 20/12* (2008.01)
  *H04L 12/26* (2006.01)
  *H04N 17/00* (2006.01)

(52) U.S. Cl.
  CPC ...... *H04L 43/0858* (2013.01); *H04L 65/4076* (2013.01); *H04L 65/80* (2013.01); *H04L 67/322* (2013.01); *H04L 69/14* (2013.01); *H04N 17/004* (2013.01); *H04N 21/2385* (2013.01); *H04N 21/2402* (2013.01); *H04N 21/6125* (2013.01); *H04N 21/64322* (2013.01)

(56) References Cited

U.S. PATENT DOCUMENTS

| | | | |
|---|---|---|---|
| 2007/0053303 A1* | 3/2007 | Kryuchkov | H04L 1/20 370/250 |
| 2007/0195707 A1* | 8/2007 | Cidon | H04L 43/50 370/252 |
| 2008/0031193 A1* | 2/2008 | Laroia | H04L 27/261 370/331 |
| 2009/0044216 A1 | 2/2009 | McNicoll | |
| 2009/0064248 A1* | 3/2009 | Kwan | H04N 21/64322 725/109 |
| 2010/0057909 A1* | 3/2010 | Varadarajan | H04L 67/1008 709/225 |
| 2010/0064324 A1* | 3/2010 | Jenkin | H04N 21/443 725/59 |
| 2011/0197246 A1* | 8/2011 | Stancato | H04L 65/4076 725/111 |
| 2011/0289218 A1 | 11/2011 | Luzzatti et al. | |
| 2012/0079545 A1 | 3/2012 | Charania et al. | |
| 2012/0233651 A1 | 9/2012 | Lee et al. | |
| 2012/0270576 A1* | 10/2012 | Herrington | H04N 21/845 455/466 |
| 2012/0317235 A1* | 12/2012 | Nguyen | H04N 21/2408 709/219 |
| 2015/0009826 A1* | 1/2015 | Ma | H04W 28/0268 370/235 |
| 2015/0040172 A1* | 2/2015 | Zelesko | H04N 21/4622 725/110 |

OTHER PUBLICATIONS

"P2PTV", Wikipedia, the free encyclopedia, page last modified Dec. 10, 2013, at 20:45, <http://en.wikipedia.org/w/index.php?title=P2PTV&oldid=585486306>.

U.S. Appl. No. 14/226,993 entitled "System for Self Organization of an Internet Protocol Television Grid", filed Mar. 27, 2014.

* cited by examiner

SYSTEM FOR SELF ORGANIZATION OF AN INTERNET PROTOCOL TELEVISION GRID

BACKGROUND OF THE INVENTION

The present invention relates generally to the field of internet protocol television, and more particularly to improving the user quality of internet protocol television.

IPTV (internet protocol television) is an electronic network or grid system where television services are provided via the internet, instead of being delivered by more traditional formats such as: (i) "over the air" broadcast; (ii) satellite; and (iii) cable. IPTV provides reliable and secure delivery of entertainment and related services to end users. These services may include: (i) live TV (television); (ii) VOD (video on demand); and (iii) iTV (interactive television).

IPTV services are delivered across an access agnostic, packet switched network (or grid) that uses IP (internet protocol) to transport: (i) audio signals; (ii) video signals; and (iii) control signals. The IPTV grid uses a network of nodes between the IPTV server(s) and the user's end point device. The end point devices may include, but are not limited to: (i) a television; (ii) a laptop computer; (iii) a tablet computer; (iv) a netbook computer; (v) a personal computer (PC); (vi) a desktop computer; (vii) a personal digital assistant (PDA); and (viii) a smart phone. IPTV service is in real time, and allows users to stream different channels through the IP network.

The use of IPTV services is ever increasing, including HDTV (high definition television) services. IPTV services require state of the art network services to ensure a high QoS (quality of service). In a very large grid of users watching various programs using an IPTV service, multiple users may watch a broadcast concurrently. As an example, two users may have sufficient network resources for good QoS with a satisfying QoE, while a third user may observe a less than ideal QoS that leads to a poor QoE (quality of experience). Different scenarios and conditions may lead to loading the network with huge traffic demands. Such scenarios may include but are not limited to: (i) large numbers of users demanding the same live stream and/or demanding to view a live stream at the same time, creating an unbalanced load on the network; (ii) large numbers of users in the same locality tuning to the same stream, creating congestion on the link serving that locality; and/or (iii) large numbers of users in the same locality, tuning to the same stream with different network capacities, resulting in different QoE.

SUMMARY

According to an aspect of the present invention, there is a method, system and/or computer program product that performs the following steps (not necessarily in the following order): (i) establishing an internet protocol television (IPTV) grid including an IPTV server, a plurality of grid nodes, a first end user device and a second end user device; (ii) communicating an IPTV channel signal over a first communication path that begins at the IPTV server and ends at the first end user device; (iii) communicating the IPTV channel signal over a second communication path that begins at the IPTV server and ends at the second end user device; (iv) determining that a quality issue condition exists for the channel signal as communicated to the second end user device; and (v) responsive to the determination of the quality issue condition, communicating the IPTV channel signal over a third communication path that begins at the first end user device and ends at the second end user device.

DETAILED DESCRIPTION

Figure 1:
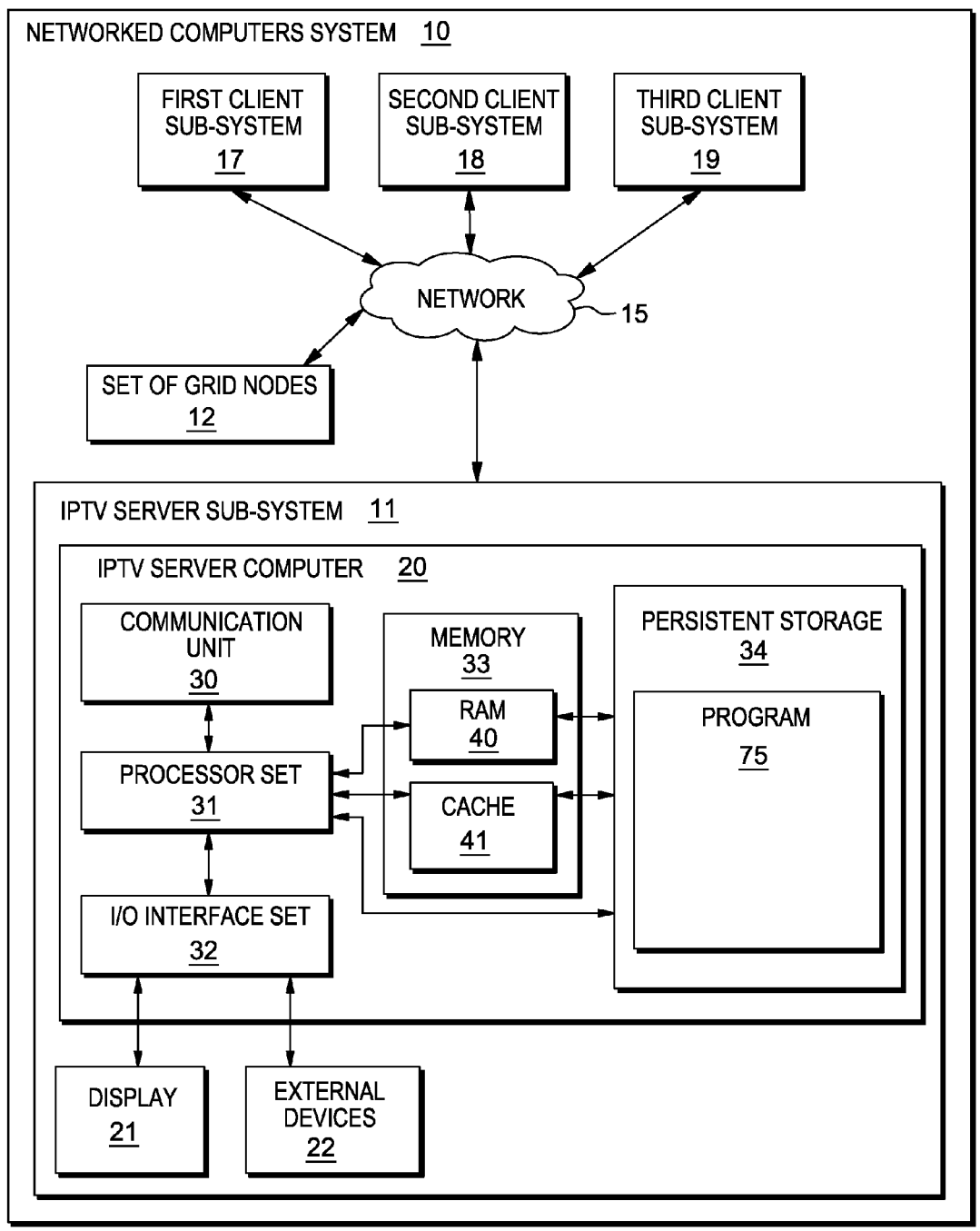
FIG. 1 is a schematic view of a first embodiment of a networked computers system according to the present invention.

Some embodiments of the present invention are directed to a method controlling communication of a channel signal over an Internet Protocol Television (IPTV) grid where a channel signal is passed through to a first end user device through a peer (that is, a second end user device) in responsive to a determination that a quality issue condition (for example, poor signal quality) exists with respect to the first end user device. In some embodiments, the quality issue condition at the first user's end device will be based on an initial connection to the IPTV server which passes through no peers. In other embodiments, the first end user's device may be switched, responsive to the quality problem from an earlier peer based connection to a new peer based connection that passes through the second end user's device. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of a networked computers system 10, including: internet protocol television (IPTV) sub-system 11; set of grid nodes 12; client sub-systems 17, 18, 19; communication network 15; IPTV server computer 20; communication unit 30; processor set 31; input/output (i/o) interface set 32; memory device 33; persistent storage device 34; display device 21; external device set 22; random access memory (RAM) devices 40; cache memory device 41; and program 75.

Sub-system 11 is, in many respects, representative of the various computer sub-system(s) in the present invention. Accordingly, several portions of sub-system 11 will now be discussed in the following paragraphs.

Sub-system 11 may be a laptop computer, tablet computer, netbook computer, personal computer (PC), a desktop computer, a personal digital assistant (PDA), a smart phone, or any programmable electronic device capable of communicating with the client sub-systems via network 15. Program 75 is a collection of machine readable instructions and/or data that is used to create, manage and control certain software functions that will be discussed in detail, below, in the Example Embodiment sub-section of this Detailed Description section.

Sub-system 11 is capable of communicating with other computer sub-systems via network 15. Network 15 can be, for example, a local area network (LAN), a wide area network (WAN) such as the Internet, or a combination of the two, and can include wired, wireless, or fiber optic connections. In general, network 15 can be any combination of connections and protocols that will support communications between server and client sub-systems.

Sub-system 11 is shown as a block diagram with many double arrows. These double arrows (no separate reference numerals) represent a communications fabric, which provides communications between various components of sub-system 11. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 33 and persistent storage 34 are computer-readable storage media. In general, memory 33 can include any suitable volatile or non-volatile computer-readable storage media. It is further noted that, now and/or in the near future: (i) external device(s) 22 may be able to supply, some or all, memory for sub-system 11; and/or (ii) devices external to sub-system 11 may be able to provide memory for sub-system 11.

Program 75 is stored in persistent storage 34 for access and/or execution by one or more of the respective computer processors 31, usually through one or more memories of memory 33. Persistent storage 34: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 34.

Program 75 may include both machine readable and performable instructions and/or substantive data (that is, the type of data stored in a database). In this particular embodiment, persistent storage 34 includes a magnetic hard disk drive. To name some possible variations, persistent storage 34 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 34 may also be removable. For example, a removable hard drive may be used for persistent storage 34. Other examples include optical and magnetic disks, thumb drives, and smart cards that are inserted into a drive for transfer onto another computer-readable storage medium that is also part of persistent storage 34.

Communications unit 30, in these examples, provides for communications with other data processing systems or devices external to sub-system 11. In these examples, communications unit 30 includes one or more network interface cards. Communications unit 30 may provide communications through the use of either or both physical and wireless communications links. Any software modules discussed herein may be downloaded to a persistent storage device (such as persistent storage device 34) through a communications unit (such as communications unit 30).

I/O interface set 32 allows for input and output of data with other devices that may be connected locally in data communication with server computer 200. For example, I/O interface set 32 provides a connection to external device set 22. External device set 22 will typically include devices such as a keyboard, keypad, a touch screen, and/or some other suitable input device. External device set 22 can also include portable computer-readable storage media such as, for example, thumb drives, portable optical or magnetic disks, and memory cards. Software and data used to practice embodiments of the present invention, for example, program 75, can be stored on such portable computer-readable storage media. In these embodiments the relevant software may (or may not) be loaded, in whole or in part, onto persistent storage device 34 via I/O interface set 32. I/O interface set 32 also connects in data communication with display device 21.

Display device 21 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
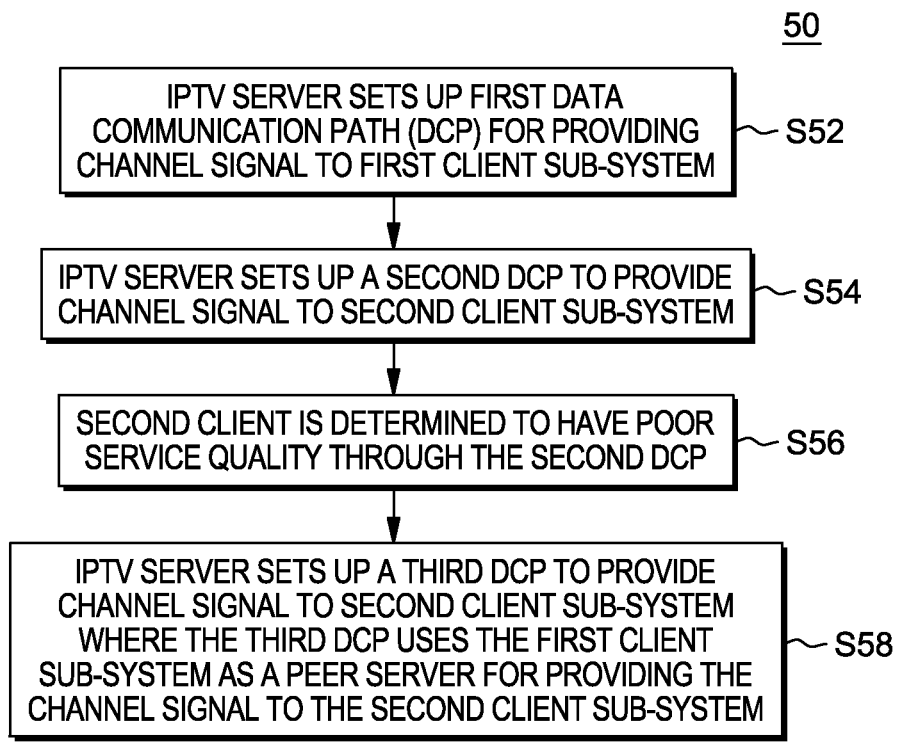
FIG. 2 is a flowchart showing a process performed, at least in part, by the first embodiment system.
Figure 3:
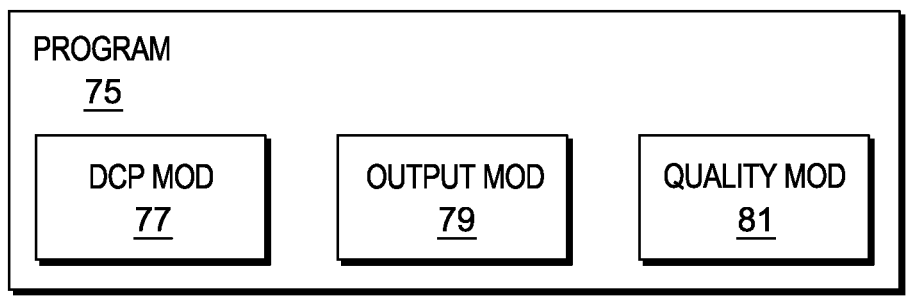
FIG. 3 is a schematic view of a software portion of the first embodiment system.

FIG. 2 shows a flow chart 50 depicting a method according to the present invention. FIG. 3 shows program 75 for performing at least some of the method steps of flow chart 50. This method and associated software will now be discussed, over the course of the following paragraphs, with extensive reference to FIG. 2 (for the method step blocks) and FIG. 3 (for the software blocks).

Processing begins at step S52, where data communication path module (DCP mod) 77 of program 75 of IPTV server sub-system 11 (see FIG. 1) sets up a first data communication path (DCP) for providing a channel signal (for example, a signal containing audio and video for a television program) to first client sub-system 17 (which includes a first user's end device that is used for watching and listening to the channel signal). As is generally the case with DCPs according to the present invention, the DCP could be wired, wireless or a combination. When calculating an MOS of each of the end user that the IPTV server can provide, it will take into account the factors related to the wired or wireless connection from delay and losses issues. After the first DCP is set up, output mod 79 and communication unit 30 (see FIG. 1) actually sends the channel signal content through network 15 to the first client sub-system.

More specifically, in this example, IPTV server sub-system sends the channel signal through network 15, and various grid nodes of set of grid nodes 12, so that the first DCP set up in step S52 ends at first client sub-system 17. In this example, the first DCP does not, as it is data communicated from IPTV server sub-system 11 to first client sub-system 17, pass through any peers (that is, other user end devices). Alternatively, the first DCP could pass through other user end devices on its way to first client sub-system 17.

Processing proceeds to step S54, where data communication path module (DCP mod) 77 of program 75 of IPTV server sub-system 11 (see FIG. 1) sets up a second data communication path (DCP) for providing the channel signal to second client sub-system 18 (which includes a second user's end device that is used for watching and listening to the channel signal). After the first DCP is set up, output mod 79 and communication unit 30 (see FIG. 1) actually sends the channel signal content through network 15 to the first client sub-system. More specifically, in this example, IPTV server sub-system sends the channel signal through network 15, and various grid nodes of set of grid nodes 12, so that the second DCP set up in step S54 ends at second client sub-system 18. In this example, the second DCP does not, as it is data communicated from IPTV server sub-system 11 to second client sub-system 18, pass through any peers (that is, other user end devices). Alternatively, the first DCP could pass through other user end devices on its way to second client sub-system 18. In some embodiments of the present invention step S54 will occur at the same time, or prior to, step S52.

Processing proceeds to step S56 where quality mod 81 determines that a quality issue condition (see definition, below) exists with respect to the second DCP and the second client sub-system. As mentioned, below, in the "quality issue condition" definition, the quality issue can not merely be that the second DCP has a low bandwidth, but must relate more directly to the quality of the picture and sound received at the second client sub-system. Examples of quality issue conditions will be discussed in more detail, below, in the Further Comments And Embodiments sub-section of this Detailed Description section. In this embodiment, there are several possible quality issue conditions that might be detected when the second DCP is subject to various different types of degraded quality. Alternatively, some embodiments reduce all quality measures down to a single metric, and the quality issue condition comes to exist when that metric falls below a predetermined threshold for a predetermined amount of time.

Processing proceeds to step S58 where DCP mod 77, in response to the detection of the quality issue condition, sets up a third DCP, beginning at first client sub-system and ending at second client sub-system. This third DCP effectively replaces the second DCP that had been subject to the quality issue condition. This third DCP is a "peer to peer connection." Once the third DCP is set up, the channel signal gets from the IPTV server to the second client sub-system by travelling to the first client sub-system through the first DCP (set up in step S52), and then through the third DCP that ends at the second client sub-system. In this embodiment, the peer-to-peer third DCP passes through network 15 and some of the grid nodes of set of grid nodes 12 on its way from the first client sub-system to the second client sub-system. Alternatively, the third DCP could directly connect the first client sub-system to the second client sub-system. In some embodiments, the quality of a signal from the first client sub-system to the second client sub-system is tested before the third DCP is fully set up, so that some other peer (such as third client sub-system 19) can be chosen as the source of the third DCP if the quality of the signal sent from the first client sub-system to the second client sub-system turns out to be low quality for some reason.

III. Further Comments and/or Embodiments

Some embodiments of the present invention recognize that state of the art systems and methods, in IPTV (internet protocol television) applications, do not sufficiently provide for users who experience a poor QoE (quality of experience). According to some embodiments of the present invention a concept of a self organizing and optimizing network is used as a solution to ensure an improved QoE for all users. For example, four (4) end users are watching an IPTV broadcast stream. Users A, B and C are all in the same network grid and are all watching the same channel, while user D is in the same network grid, but is watching a different channel. Users A and C are experiencing good or excellent QoE, while user B is experiencing poor QoE. Accordingly, a decision is made, by software controlling the IPTV system, to provide a direct link from user A or C, to user B. In this example the link, using the grid of network nodes, is provided between user B and user A. The link with better QoS (quality of service) factors achieves a higher QoE for the end user, in this case user B. By developing this system for self organization of a network grid, this will not only lead to enhancing the stream quality to user B, but will also increase the streaming IPTV quality for users A and C. This is because, according to some embodiments of the present invention, all resources of the network grid are re-distributed and the IPTV server load, in general, has been decreased.

Some embodiments of the present invention may recognize one, or more, of the following potential problems and/or potential opportunities for improvement: (i) conventional IPTV systems do not generally self organize a network grid; (ii) conventional IPTV systems do not automatically change the direct provider to ensure a high QoE for the IPTV service for all users in the same network grid; (iii) current relevant work in the area of IPTV describes different methods for distributing geographical restriction data in an IPTV system; (iv) in real time, no solution or system exists that changes the IPTV stream provider, according to the current/predicted QoS of the intermediate link between different users in a network grid; and (v) no solution or system exists that redistributes the IPTV load according to the predicted QoE being achieved/realized.

Some embodiments of the present invention may further include one, or more, of the following characteristics, features and/or advantages: (i) enhance the QoE for all users in the same network grid that are streaming the same channel by redistributing the resources of the network grid; (ii) enhance the QoE of all users by decreasing the load on the IPTV server; (iii) enhance the QoE for all users by making some users, with a high QoE, act as an IPTV proxy server for other members of the grid; (iv) real time feedback from all the users in a network grid, streaming from the same IPTV server, to indicate issues with a given user's QoE; (v) users with a higher QoE by using a direct link from users with a higher network capacity/QoE to enhance the overall QoE for the entire network grid; (vi) up to date network feedback; (vii) real time network feedback; and (viii) network feedback which is managed by the IPTV server.

Further with regard to item (v) in the above paragraph, to provide users with a higher QoE, the following points may be considered: (a) the current status of the users QoE; (b) the expectation/prediction of the quality of the intermediate links between users watching the same stream; and (c) network resources/re-management.

Some embodiments of the present invention further recognize that IP (internet protocol) networks frequently provide "best effort" services, but it may not guarantee good QoS due to the nature of IP (delay, packet loss, jitter, etc.). These will eventually affect the end user's perceived quality. While many users are connected to a certain IPTV server and are watching the same channel, some users might experience poor QoE, while others may have good or excellent perceived quality. There is a need for a real time system update from all of the users, managed by the IPTV severs, in order to detect problems in the QoE from any user in a certain network grid. The system will suggest another user in the same network grid to act as an IPTV proxy server, by providing a direct link to content, thus ensuring improved QoE. As an example, if users A and B are watching the same streamed channel from the same IPTV server, after a short time, user B is annoyed by the poor quality he is receiving, while user A is receiving high quality.

According to an embodiment of the present invention, a method of providing an IPTV signal includes the following steps: (i) software controlling the IPTV organization network determines that there is an issue with user B's QoE; (ii) the software further determines that user A would be able to provide a "direct link" to user B, preserving high QoE for both users; (iii) the software sets up the direct link from user A to user B; (iv) user A decides to change the channel, which means that user A can no longer provide a direct link for that channel to user B; (v) the software finds that user C can provide a "direct link" for the channel of interest to user B; and (vi) the software sets up a "direct link" from user C to user B.

Some embodiments of the present invention may further include one, or more, of the following characteristics, features and/or advantages: (i) a self organization system for the IPTV service; (ii) application of the ITU-T G.1070 (International Telecommunication Union-Telecommunications) in real time between all the users in the grid watching the same channel; (iii) ITU-T G.1070 mapping of various QoS factors to a single metric value, that ranges from 1 (poor) to 5 (excellent), indicating the QoE of the video quality; (iv) the IPTV system has the ability to determine the user with a poor QoE in order to find an alternative streaming provider; (v) the IPTV system enhances the overall QoE of all the users in the same network grid by decreasing the load from the IPTV server; (vi) the IPTV system provides online monitoring for the quality of end users; and (vii) the IPTV system can be pre-adjusted, before any known social context, in order to configure the users in a certain network grid to prevent critical problems from arising.

With respect to item (vii) in the preceding paragraph, the phrase "before any known social context" means that there is a possibility that the system could take into account social events that will occur. Consequently, the system could be able to have a pre-defined suggestion for the self organization network grid before the social event so that when the event starts it will speed up the convergence to the optimum system that will provide from initial start of the event. In this way, a higher quality can be achieved for all end users.

As shown in FIGS. 4 to 9, IPTV system 100 is controlled to communicate channels. As shown in FIGS. 4 to 9, system 100 includes: grid 102; IPTV server 104; grid end user devices (also sometimes referred to herein respectively, as users A, B, C and D) 106, 108, 110, 112; grid nodes 120; potential communication paths 130; channel communication paths 140, 142, 144; and feedback paths 150.

Figure 4:
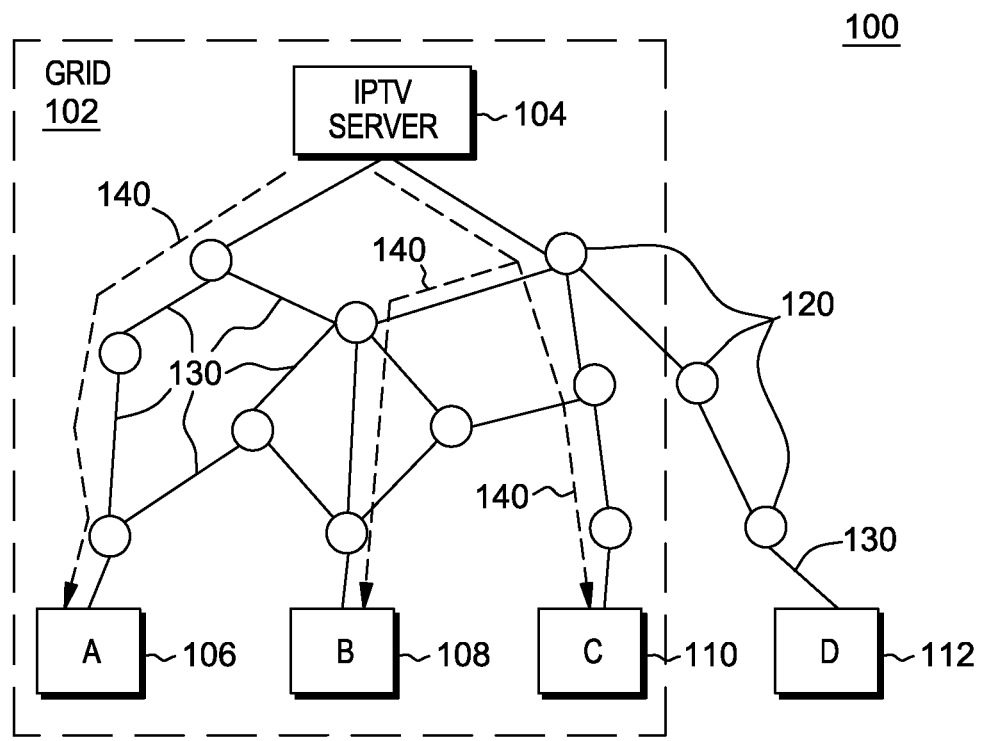
FIG. 4 is a schematic view of a second embodiment of a system, according to the present invention, in a first operating state.

As shown in FIG. 4, user A (using end user device 106), user B (using end user device 108), user C (using end user device 110) and user D (using end user device 112) are in the same network grid and are receiving the same broadcast stream from the IPTV server 104 through channel communication path 140. User D is watching another channel through grid nodes 120 and channel communication path 130. Periodically, users A, B and C calculate an estimate of their QoE MOS that ranges from 1 (poor quality) to 5 (excellent quality) by applying ITU-T G.1070.

Figure 5:
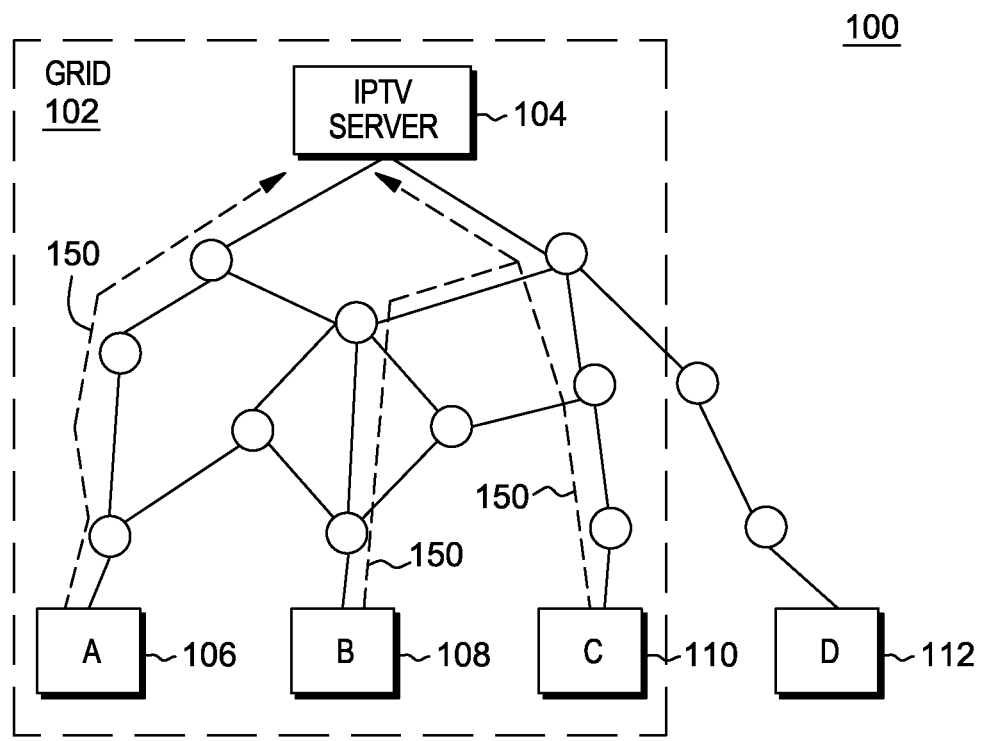
FIG. 5 is another schematic view of the second embodiment system, in a second operating state.

As shown in FIG. 5, each user will update the MOS to the IPTV server 104 using feedback paths 150. The IPTV server 104 determines that users A and C are having excellent QoE, while user B has a critical issue with his QoE.

Figure 6:
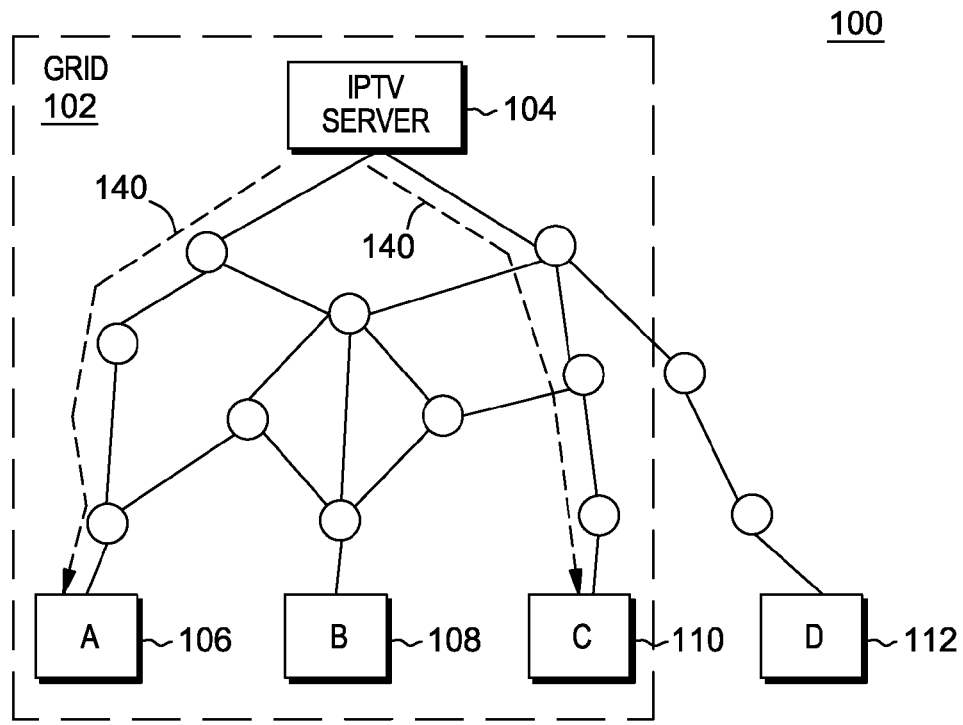
FIG. 6 is another schematic view of the second embodiment system, in a third operating state.

As shown in FIG. 6, the IPTV server 104 requests from users who are having excellent QoE, in this case users A and C, the possibility of providing streaming content to user B, who is experiencing poor QoE, by using channel communication paths 140.

Figure 7:
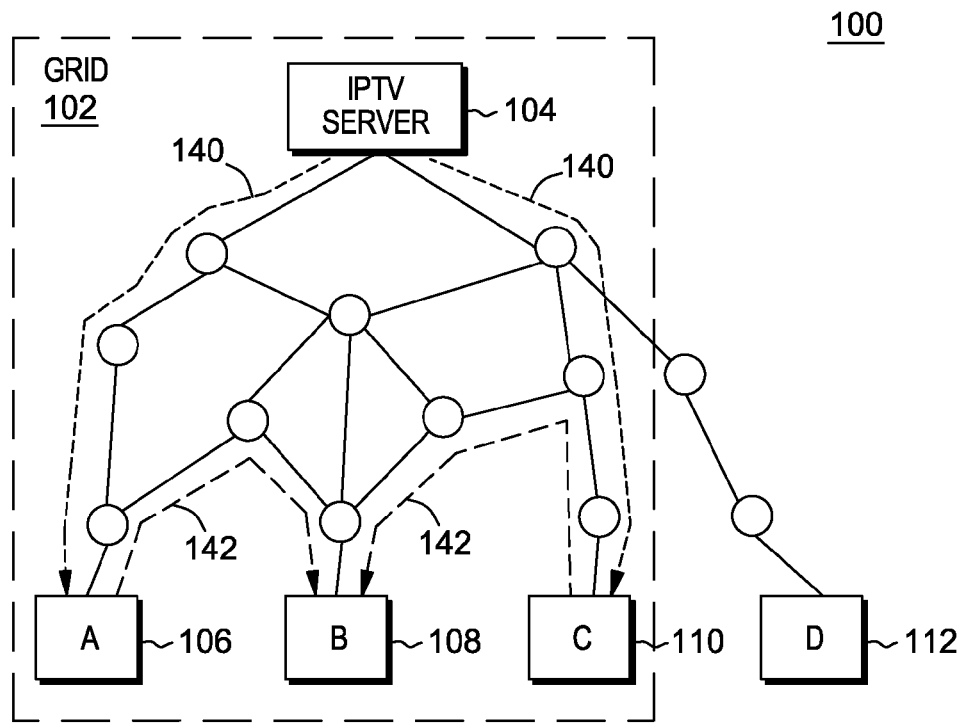
FIG. 7 is another schematic view of the second embodiment system, in a fourth operating state.

As shown in FIG. 7, IPTV server 104 supplies the broadcast stream to users A and C using channel communication paths 140. Users A and C then measure the QoS between them and user B, using channel communication paths 142, and map it to a QoE MOS.

Figure 8:
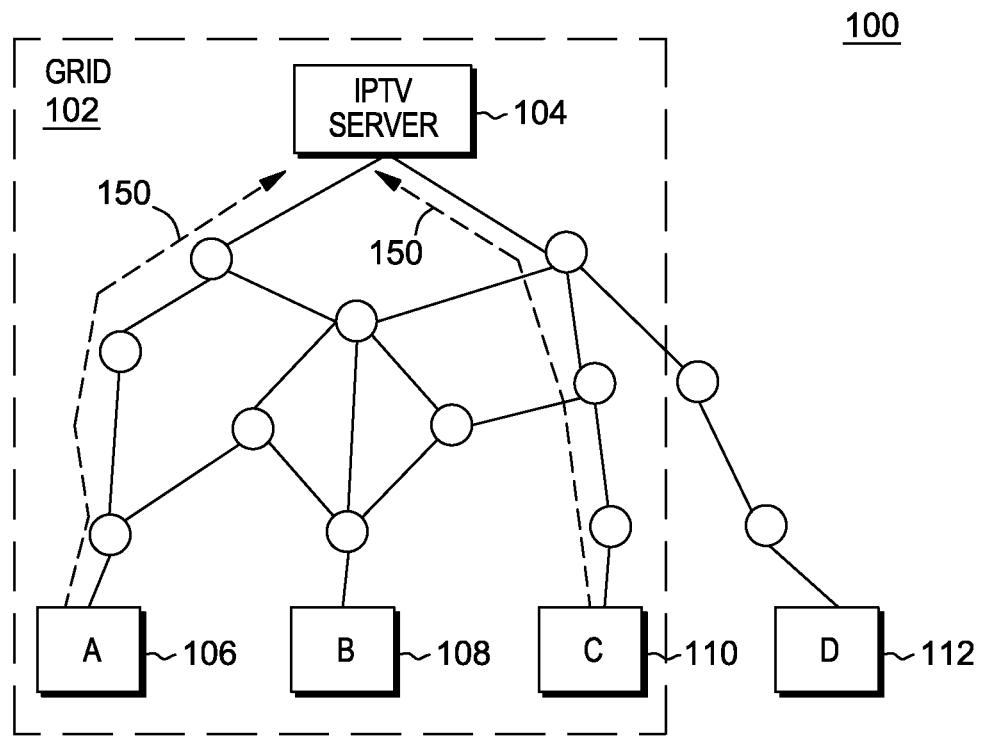
FIG. 8 is another schematic view of the second embodiment system, in a fifth operating state.

As shown in FIG. 8, users A and C update the IPTV server 104 with the expected MOS using feedback paths 150. This feedback provides IPTV sever 104 with the data as to what QoS can be achieved, if users A and C provide a direct link to user B.

Figure 9:
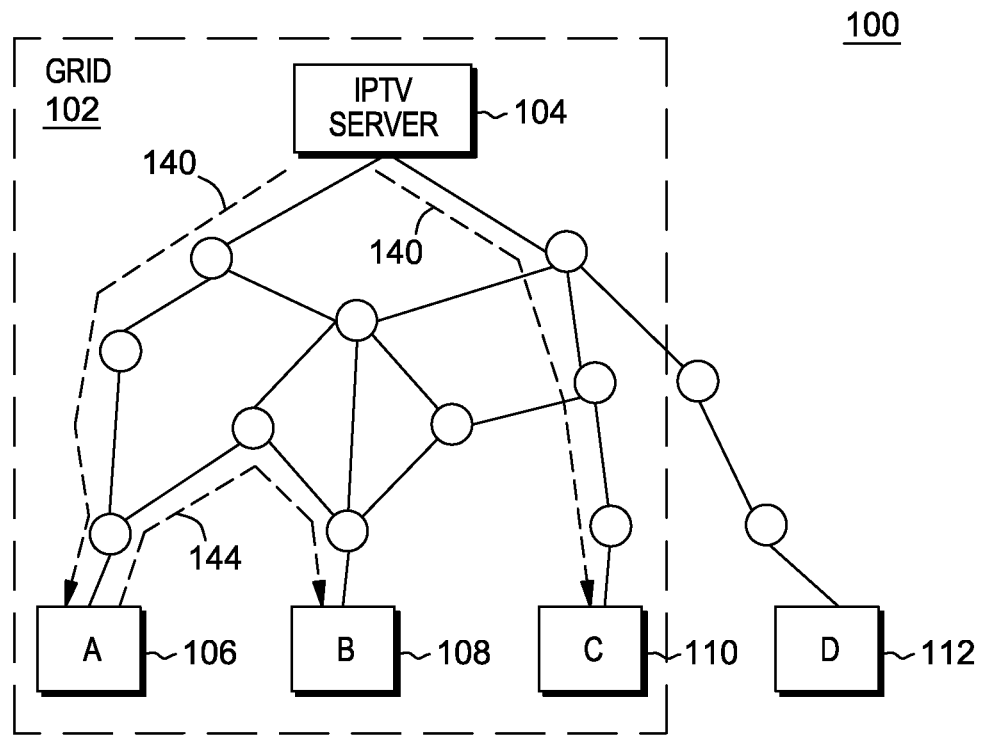
FIG. 9 is another schematic view of the second embodiment system, in a sixth operating state.

As shown in FIG. 9, the IPTV server 104 determines the most appropriate user to provide the link to user B using channel communications paths 140 and 144. This is now representative of the final network organization. It should be noted that the best QoS for any given end user may in fact be directly from IPTV server 104, and not use another user like users A or C, as a proxy server.

Some embodiments of the present invention may further include one, or more, of the following characteristics, features and/or advantages: (i) determining which users are achieving good QoE and which users are not; (ii) users with good QoE are directed to route the IPTV stream to users without good QoE; (iii) the ability to apply existing network mechanisms to send and route IPTV data; (iv) use of known mechanisms to enhance the end user experience in the context of peer-to-peer based networks; (v) a system that is based on self organization networking grid based on the video/audio quality perceived at the end user; (vi) use of a single metric that may, in various embodiments, include various factors such as audio factors (for example, audio random losses, audio burst losses, audio delay and audio codec impairment factor) and video factors (for example, video random losses, video burst losses, video delay, video codec impairment factor, video bit rate, frame rate, video display size, video resolution and key frame interval); (vii) use of a single quality metric that will indicate the overall end user perceived quality to allow machine logic to predict whether another end-user could provide that stream but with higher quality (if -so, the content provider is switched to this other user): and/or (viii) after several iterations, improved self organization to the whole grid results in a better overall quality for all users.

One method according to the present invention includes the following steps: (i) identifying the users suffering from bad quality (sometimes herein referred to a "Phase 1"); (ii) determining the users that they stream same content (sometimes herein referred to a "Phase 2"); (iii) predicting the quality of the sufferers if one of the others streamed this content (sometimes herein referred to a "Phase 3"); and (iv) determining, by machine logic, whether to switch to change the content provider for particular user or not (sometimes herein referred to a "Phase 4").

Some embodiments of the present invention may further include one, or more, of the following characteristics, features and/or advantages: (i) emulate the traffic of the video streaming content; (ii) predict the experienced quality from providing direct content to a specific user; (iii) predict the video quality by emulating the codec's (encoder/decoder) traffic; (iv) make data stream decisions based on the MOS; (v) make data stream decisions where the factors are combined into a single metric, which indicates the expected/predicted quality if the video is streamed through a specific link; (vi) make data stream decisions based on factors alternative and/or additional to the length of the routes; and/or (vii) provide better streaming video quality, which is not only faster but is also better in quality.

Further with regard to item (iv) in the above paragraph, the MOS may take in to account, but is not limited to, the following factors: (a) jitter; (b) data losses; (c) data delay; (d) the codec used; (e) video format; and/or (f) video frame rates.

Some embodiments of the present invention may further include one, or more, of the following characteristics, features and/or advantages: (i) real time monitoring of multimedia quality; (ii) suggesting another user as an alternative streaming provider for poor QoE; (iii) ability to predict the multimedia quality between two users without sending audio/video sequences; (iv) ability to predict multimedia quality by taking into account different QoS factors (as will be discussed in more detail two paragraphs below); (v) emulate the traffic pattern of the codec used in the IPTV system; (vi) estimate call quality based on the measured QoS factors between two users, that is, a user experiencing poor QoE and a user experiencing good or excellent QoE; (vii) suggest another user be used to provide direct content, based on the multimedia quality; and/or (viii) consideration of all of these factors, in a single unified metric, when making a decision on selecting a particular user.

Further with regard to item (iii) and item (iv) in the above paragraph, the ability to predict multimedia quality has been practically performed by: (a) sending the same codec's pattern in the IPTV system between two (2) users; (b) measuring the different network statistics; and (c) mapping these parameters to a single metric where a data stream decision can be made.

Further with regard to item (iv) two paragraphs above, factors affecting bandwidth may include but are not limited to: (a) random losses; (b) bursty losses; (c) queuing delays; (d) propagation delays; (e) special codec impairment factors; (f) frame rates; (g) bit rates; and (h) delay synchronization between the audio and video which results in a lip synchronization error. Audio and video delay synchronization is one of the main factors that can dramatically annoy end users.

Some embodiments of the present invention may further recognize one, or more, of the following characteristics, features and/or advantages: (i) obtaining feedback from users on the quality of multimedia; (ii) quality assessment is not limited to video quality; (iii) use of feedback from one user to suggest that another user be used as an alternative streaming provider in the event of poor multimedia quality; and/or (iv) prediction of multimedia quality between a user experiencing poor QoE and other users receiving the same channel signal from the IPTV server. One way to perform the prediction mentioned in item (iv) relies on sending the same traffic pattern, but with no real audio/video packets. This traffic measures different QoS factors between users in order to estimate the multimedia quality.

Some embodiments of the present invention may include one, or more, of the following features, characteristics and/or advantages when calculating user experience (that is, determining whether a quality issue condition exists): (i) use of hardware, software and/or algorithms conventionally used for determining quality of monitored integrated telecommunications operator services; (ii) using network data obtained by means of monitoring platforms previously deployed in network operators for monitoring the user services and experience questionnaires; (iii) use of correlation algorithms of the phase of combining network data identify the network data; (iv) training data stored in a predetermined phase contains the most significant parameters contributing to the quality of experience; (v) quality issue condition determination parameters are selected from type of content; and/or (vi) the votes are weighted according to phase (that is, Phase 1, 2, 3 or 4).

Some embodiments of the present invention include a new self organization system for the network grid of the IPTV which will have one, or more, of the following features, characteristics and/or advantages: (i) result in a better distribution for the network resources resulting in an overall better perceived user quality at the end users; and (ii) enhance the QoE of all of the users in the same network grid streaming the same channel by redistributing the resources of the network grid and our inventive step is to do so by decreasing the load on the IPTV server and to make some of those users with a high QoE to act as an IPTV proxies for members of that grid; (iii) improve and better organize the network grid; (iv) include the ability to determine the user with a bad QoE in order to find an alternative streaming provider; (v) enhance the overall QoE of all the users in the same network grid by decreasing the load from the IPTV server; (vi) provide online monitoring for the IPTV quality at the end users; and/or (vii) be pre-adjusted before any known social context in order to configure the users in a certain network grid to prevent any critical problems before being raised.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Software storage device: any device (or set of devices) capable of storing computer code in a manner less transient than a signal in transit.

Tangible medium software storage device: any software storage device (see Definition, above) that stores the computer code in and/or on a tangible medium.

Non-transitory software storage device: any software storage device (see Definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

Quality issue condition: any condition that directly negatively impacts an end user's viewing and/or listening experience based, at least in part, upon at least one of the following characteristics: audio random losses, audio burst losses, audio delay and audio codec impairment factor, video random losses, video burst losses, video delay, video codec impairment factor, video bit rate, frame rate, video display size, video resolution, key frame interval, and/or the lip synchronization; when at least two of the foregoing factors are considered as a single metric (which may or may not include consideration of additional factors) then the corresponding "quality control issue" for these embodiments is sometimes herein referred to as a "single metric quality control issue;" when all of the foregoing factors are considered as a single metric (which may or may not include consideration of additional factors) then the corresponding "quality control issue" for these embodiments is sometimes herein referred to as a "comprehensive single metric quality control issue;" while some embodiments of the present invention may include a consideration of bandwidth, bandwidth is not considered as a "quality issue condition" as that term is hereby defined.

What is claimed is:

1. A method comprising:
    establishing an internet protocol television (IPTV) grid including an IPTV server, a plurality of grid nodes, a first end user device and a second end user device;
    communicating an IPTV channel signal over a first communication path that begins at the IPTV server and ends at the first end user device;
    communicating the IPTV channel signal over a second communication path that begins at the IPTV server and ends at the second end user device;
    determining that a quality issue condition exists for the channel signal as communicated to the second end user device;
    for each of a plurality of potential provider end user devices including the first end user device, predicting, without actually sending audio or video sequences, multimedia quality for data sent from the potential provider end user device to the second end user device;
    selecting the first end user end device as a provider end user device based, at least in part, on the prediction of multimedia quality for each of the plurality of potential end user devices; and
    responsive to the determination of the quality issue condition and further in response to selection of the first end user device as the provider end user device, communicating the IPTV channel signal over a third communication path that begins at the first end user device and ends at the second end user device;
    wherein the prediction of multimedia quality for each of the plurality of potential end user devices includes:
        sending a pattern associated with a codec used with the IPTV channel in the IPTV system from the potential end user device of the plurality of potential end user devices to the second end user device,
        responsive to the sending of the pattern, measuring a set of network statistic(s), and
        mapping the set of network statistic(s) to a single metric for each potential provider end user device of the plurality of potential provider end user devices; and
    the selection step includes comparing the potential provider end user devices based on the single metric corresponding to each potential provider end user device.

2. The method of claim 1 further comprising:
    selecting the plurality of potential provider end user devices based, at least in part, on quality of experience (QoE) parameter(s).

3. The method of claim 1 wherein the prediction of multimedia quality for each of the plurality of potential end user devices includes taking into account at least one of the following quality of service related factors: random losses, bursty losses, queuing delays, propagation delays, special codec impairment factors, frame rates, bit rates and delay synchronization between audio and video of the channel signal.

* * * * *